(12) United States Patent
Imamoto et al.

(10) Patent No.: US 8,071,919 B2
(45) Date of Patent: Dec. 6, 2011

(54) HEATING COOKER

(75) Inventors: Kazunari Imamoto, Gifu (JP); Takeshi Esaki, Aichi (JP); Masao Kondo, Aichi (JP); Katsuharu Matsuo, Aichi (JP)

(73) Assignees: Kabushiki Kaisha Toshiba, Tokyo (JP); Toshiba HA Products Co., Ltd., Osaka (JP); Toshiba Consumer Marketing Corporation, Tokyo (JP)

( * ) Notice: Subject to any disclaimer, the term of this patent is extended or adjusted under 35 U.S.C. 154(b) by 274 days.

(21) Appl. No.: 11/594,796

(22) Filed: Nov. 9, 2006

(65) Prior Publication Data

US 2007/0108184 A1 May 17, 2007

Related U.S. Application Data

(63) Continuation of application No. PCT/JP2005/007080, filed on Apr. 12, 2005.

(30) Foreign Application Priority Data

May 10, 2004 (JP) ................................ 2004-139818
Jun. 17, 2004 (JP) ................................ 2004-179958

(51) Int. Cl.
*H05B 3/58* (2006.01)
*H05B 6/02* (2006.01)

(52) U.S. Cl. .................. 219/443.1; 219/445.1; 219/601

(58) Field of Classification Search .... 219/443.1–468.2, 219/601, 441; 313/495–497
See application file for complete search history.

(56) References Cited

U.S. PATENT DOCUMENTS

| | | | | |
|---|---|---|---|---|
| 3,796,850 A | * | 3/1974 | Moreland et al. | 219/622 |
| 4,057,670 A | * | 11/1977 | Scheidler | 428/189 |
| 5,958,272 A | * | 9/1999 | Taplan et al. | 219/445.1 |
| 6,525,300 B1 | * | 2/2003 | Mitra et al. | 219/443.1 |
| 6,797,297 B2 | * | 9/2004 | Schneider | 426/231 |
| 6,803,716 B1 | * | 10/2004 | Park et al. | 313/495 |
| 6,914,223 B2 | * | 7/2005 | Krause et al. | 219/460.1 |
| 7,041,945 B2 | * | 5/2006 | Aihara et al. | 219/622 |
| 2004/0007566 A1 | * | 1/2004 | Staebler et al. | 219/445.1 |
| 2006/0006789 A1 | * | 1/2006 | Itoh et al. | 313/497 |

FOREIGN PATENT DOCUMENTS

| | | |
|---|---|---|
| EP | 1 505 354 A1 | 2/2005 |
| JP | 03-030284 | 2/1991 |
| JP | 07-094267 | 4/1995 |

(Continued)

OTHER PUBLICATIONS

Examination Report for Application No. GB0623208.6 dated Aug. 6, 2008.

(Continued)

*Primary Examiner* — Sang Y Paik
(74) *Attorney, Agent, or Firm* — Pillsbury Winthrop Shaw Pittman LLP

(57) ABSTRACT

In a heating cooker, an object to be heated is placed on a top plate and is heated by a heating unit located below the top plate. The top plate is translucent and a fluorescent display tube is located below the top plate. The top plate is configured to have spectral transmission characteristics in a visible light range such that the spectral transmission at a wavelength of approximately 500 nm corresponding to blue or green is substantially one third of a spectral transmission at a wavelength of approximately 700 nm corresponding to red such that the spectral transmission is gradually rendered larger as the wavelength is increased from approximately 500 nm to approximately 700 nm.

4 Claims, 10 Drawing Sheets

FOREIGN PATENT DOCUMENTS

| | | |
|---|---|---|
| JP | 10-030824 | 2/1998 |
| JP | 2001-319566 | 11/2001 |
| JP | 2002-175874 | 6/2002 |
| JP | 2003-015560 | 1/2003 |
| JP | 2003-031347 | 1/2003 |
| JP | 2003-068435 | 3/2003 |
| JP | 2003-262345 | 9/2003 |
| WO | WO 01/72087 | 9/2001 |
| WO | WO 03/098115 A1 | 11/2003 |

OTHER PUBLICATIONS

Japanese Office Action dated Jun. 6, 2010 for Appln. No. 2004-179958.

* cited by examiner

HEATING COOKER

This application is a continuation of PCT/JP2005/007080, filed Apr. 12, 2005, which claims the benefit of priority of Japanese Application No. 2004-139818, filed May 10, 2004 and Japanese Application No. 2004-179958, filed Jun. 17, 2004, the contents of all which are incorporated herein by reference.

TECHNICAL FIELD

The present invention relates to a heating cooker constructed to heat a heated object placed on a top plate by a heating unit provided below the top plate.

BACKGROUND ART

As this type of heating cooker, for example, an induction heating cooker is known in which a liquid crystal display is provided below the top plate and a backlight is provided in the rear of the liquid crystal display so that on-off state of a heating coil serving as a heating unit, an input power level and the like are displayed by the liquid crystal display (see patent documents 1 and 2, for example). In this construction, a portion of the top plate corresponding to the liquid crystal display is transparent so that displayed contents are visible therethrough from above.

Patent document 1: Gazette of JP-A-H07-94267
Patent document 2: Gazette of JP-A-2003-31347

DISCLOSURE OF THE INVENTION

Problem to be Overcome by the Invention

The heating cooker using the above-described liquid crystal display has the following disadvantages. Firstly, when viewing displayed contents of the liquid crystal display, the user views obliquely upward relative to the liquid crystal display in many cases. However, although the liquid crystal display is illuminated by the backlight, a view angle (an angle within which the contents can be viewed) is narrow, and the displayed contents are difficult to view from an angle. Furthermore, it is found that there is a non-displayed portion as well as a displayed portion. The non-displayed portion degrades an appearance.

The present invention was made to overcome the foregoing problem and an object of the invention is to provide a heating cooker in which displayed contents can easily be viewed and an unnecessary portion can be rendered more invisible, whereupon the appearance can be improved.

Means for Overcoming the Problem

The present invention provides a heating cooker in which a heated object placed on a top plate is heated by a heating unit provided below the top plate, wherein the top plate is translucent and a fluorescent display tube is provided below the top plate.

Effect of the Invention

In the heating cooker of the present invention, the top plate is translucent and the fluorescent display tube is used as the display unit provided below the top plate. Accordingly, since the fluorescent display tube has a wider visible angle and a higher luminance than liquid crystal displays, displayed contents can be viewed more easily. Furthermore, a higher design characteristic can be achieved since a lighted display portion of the fluorescent display tube can be visible whereas a non-lighted portion becomes more invisible. Consequently, the design characteristic can be improved In addition, the top plate is configured to have spectral transmission characteristics in a visible light range such that the spectral transmission at a wavelength of approximately 500 nm corresponding to blue or green is substantially one third of a spectral transmission at a wavelength of approximately 700 nm corresponding to red and such that the spectral transmission is gradually rendered larger as the wavelength is increased from approximately 500 nm to approximately 700 nm.

EXPLANATION OF REFERENCE SYMBOLS 1 designates a cabinet, 2 heating cooker, 6 operating section, 12 left heating coil (heating unit), 13 right heating coil (heating unit), 14 central heater (heating unit), 15 top plate, 19 LED (light source), 20 and 21 heating power display portions, 22 a display portion of CAUTION AGAINST HIGH TEMPERATURE, 23 fluorescent display tube, 102 heating cooker, 112 left heating coil, 23 fluorescent display tube, 102 heating cooker, 112 left heating coil, 113 right heating coil, 115 top plate, 123 fluorescent display tube, 123a lead pin 123d display surface glass, 123l sealing cover and 135 and 136 ferrite (high permeability substance).

BEST MODE FOR CARRYING OUT THE INVENTION

The invention will be described in more detail with reference to the accompanying drawings.

Figure 1:
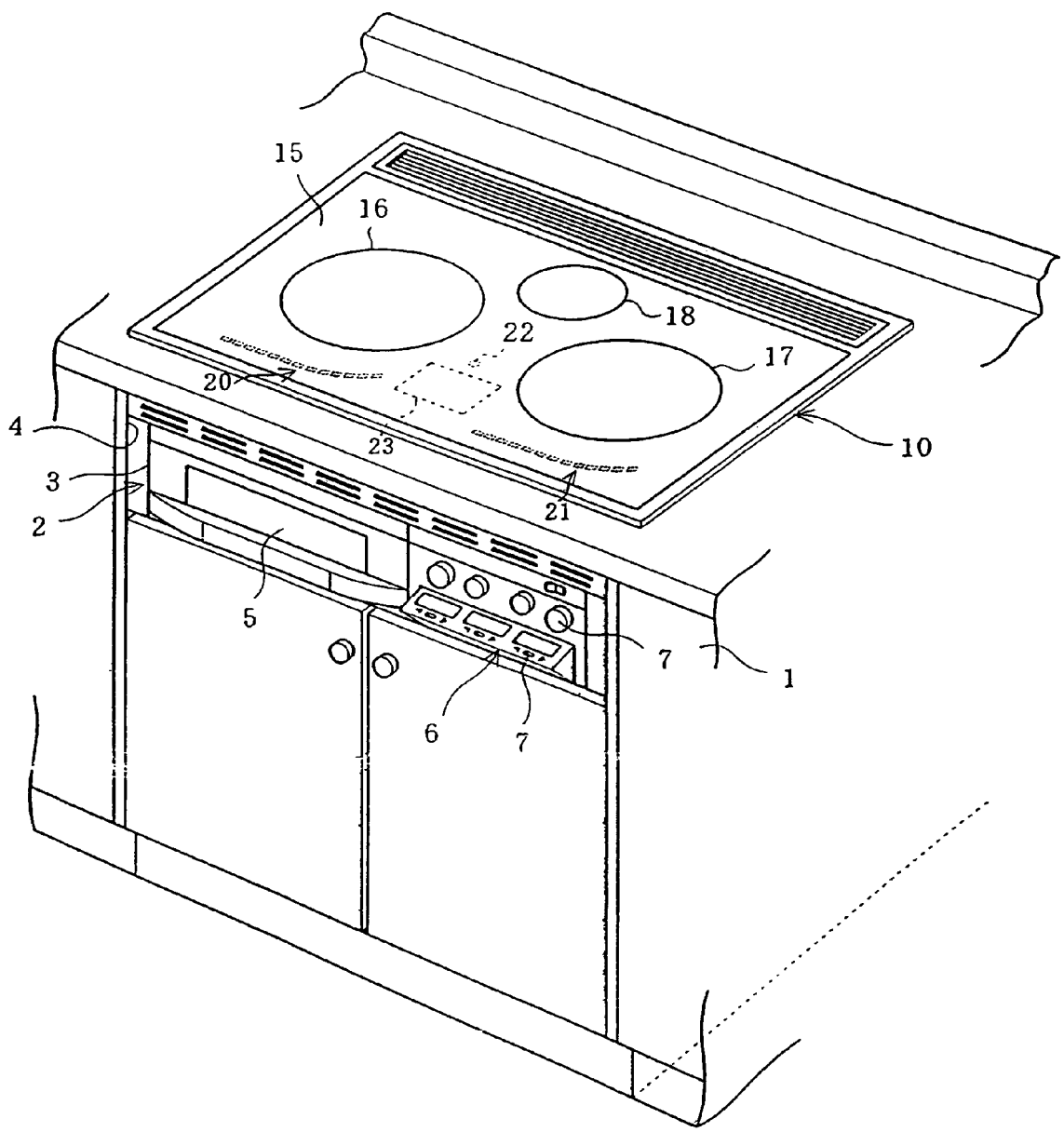
FIG. 1 is a perspective vie of a first embodiment of the present invention.

FIGS. 1 to 5 illustrate a first embodiment of the invention. Firstly, FIG. 1 shows a kitchen cabinet in which a heating cooker 2 is built. In FIG. 1, a body 3 of the heating cooker 2 is housed in a housing 4 provided in the cabinet 1. A roaster 5 is provided in the left of the body 3 whereas an operating portion 6 is provided in the right of the body 3. The operating portion 6 is provided with a plurality of switches 7.

Figure 2:
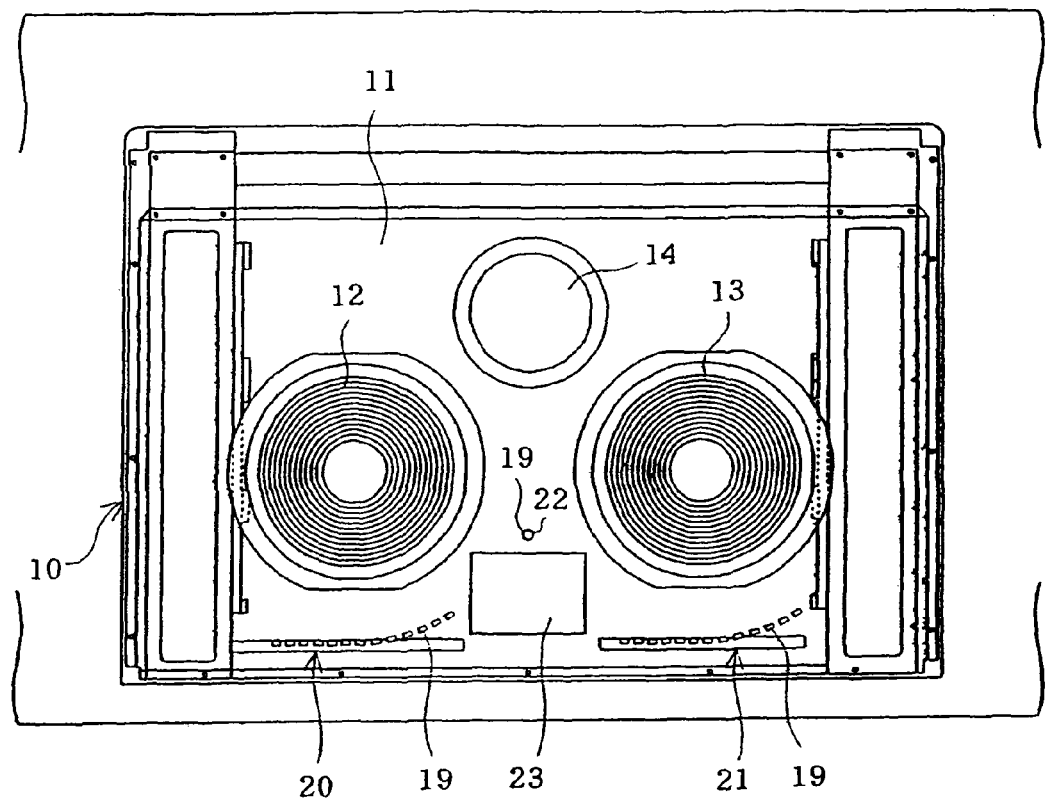
FIG. 2 is a plan view of the major part with a top plate being eliminated.
Figure 3:
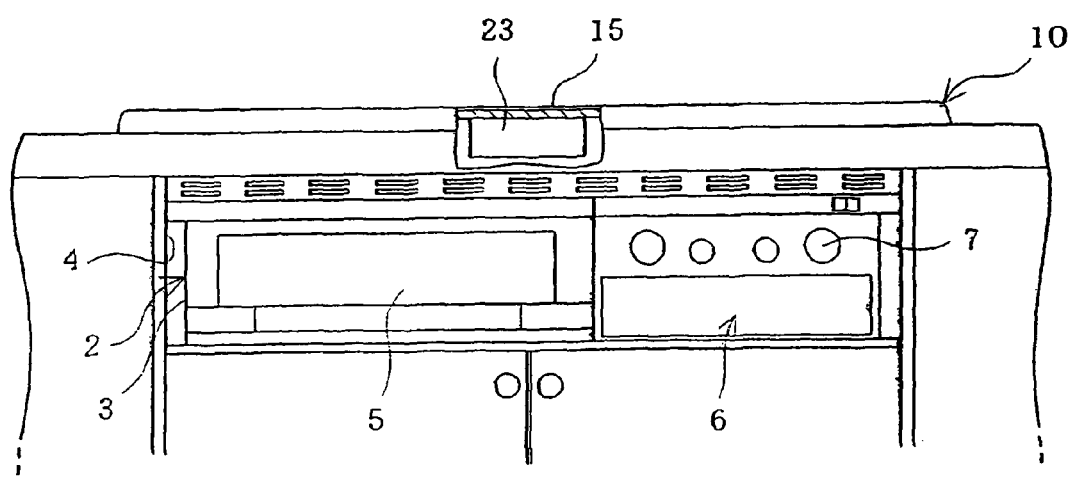
FIG. 3 is a partially broken front view of the heating cooker.

An upper heating unit 10 as shown in FIG. 2 is provided on the top of the body 3. The upper heating unit 10 includes a rectangular box-shaped upper case 11 with an upper opening, left and right heating coils 12 and 13 both for induction heating disposed left and right in the upper case 11 and a central heater 14 comprising a radiant heater, for example, located at a central rear side. The upper heating unit 10 has an upper opening closed by a top plate 15 which is made from heat-resistant glass and disposed to cover the heating coils 12 and 13 and the heater 14 from above.

Circular heating portions 16, 17 and 18 are displayed on the top plate 15 so as to be located over the left and right heating coils 12 and 13 and central heater 14 respectively. The left and right heating coils 12 and 13 are arranged to induction-heat cooking containers when energized while the cooking containers are placed on the heating portions 16 and 17, respectively. Furthermore, the central heater 14 is arranged to heat the cooking container when energized while the cooking container is placed on the heating portion 18. The left and right heating coils 12 and 13 and the central heater 14 constitute respective heating units.

Heating power displays 20 and 21 are provided in the front interior of the upper case 11 so as to be located in front of the left and right heating coils 12 and 13 respectively. Each heating power display has a number of light emitting diodes (LEDs) A caution hot display portion 22 having an LED 19 and a fluorescent display tube 23 are also provided in the front interior of the upper case 11 so as to be located between the left and right heating coils 12 and 13. Accordingly, the heating power displays 20 and 21, caution hot display portion 22 and fluorescent display tube 23 are disposed below the top plate 15. The heating power displays 20 and 21 are disposed so as to extend substantially along outer circumferences of the corresponding heating portions 16 and 17 respectively. In this case, the top plate 15 is comprised of a generally transparent crystallized glass having a rear surface (underside) formed with a thin metal film such as titan by sputtering, whereupon the top plate is translucent. The top plate 15 has spectral transmission characteristics in a visible light range as will be described later.

Figure 4:
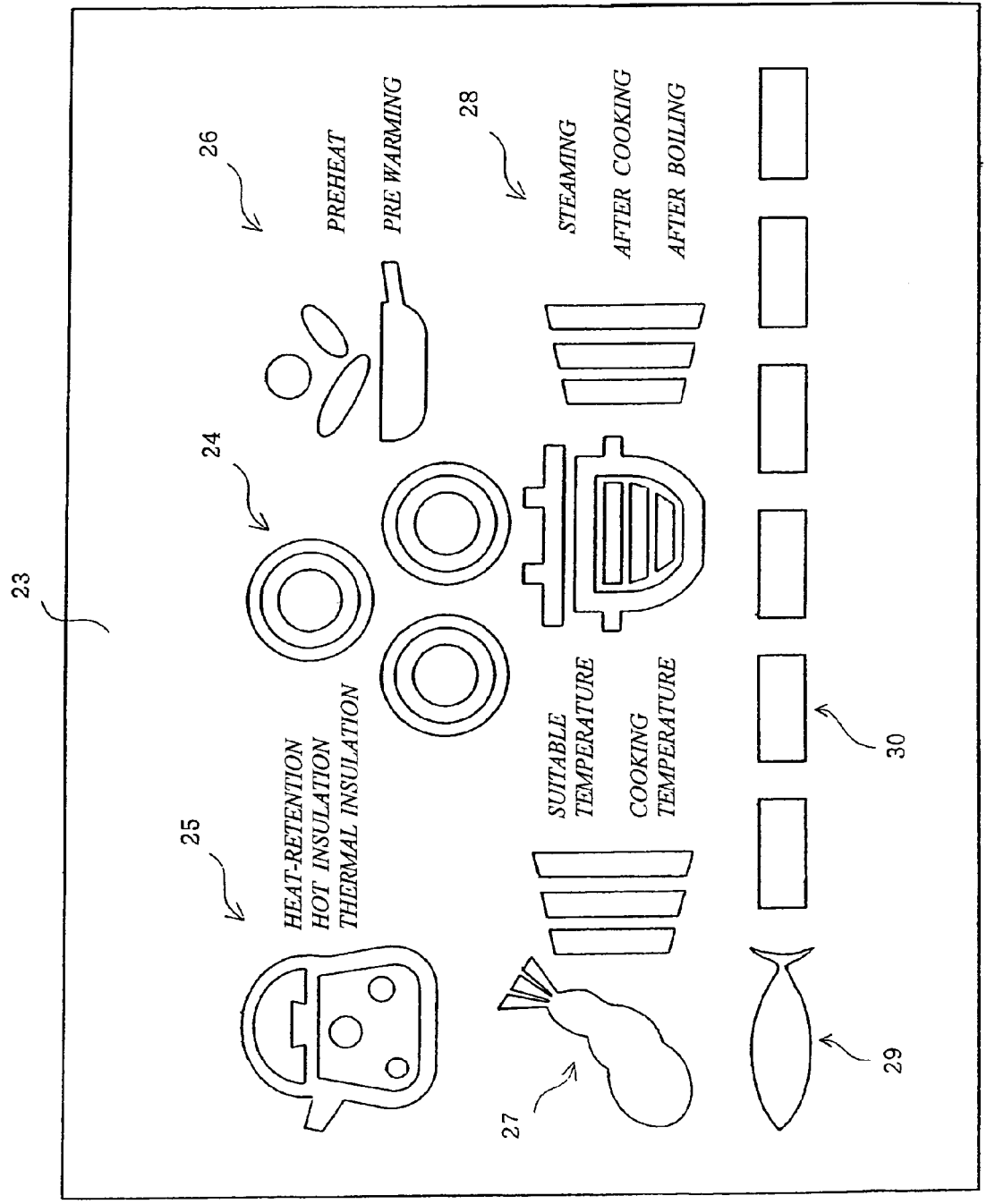
FIG. 4 is a view showing display contents of a fluorescent display tube.

FIG. 4 shows a concrete example of displayed contents of the foregoing fluorescent display tube 23. All the display portions are lighted in FIG. 4. The displayed contents of the fluorescent display tube 23 include a usage state display portion 24 displaying a usage state of each of the left and right heating coils 12 and 13 and the central heater 14, a water boiling display portion 25, a sauting display portion 26, a frying display portion 27, a rice cooking display portion 28, a roaster display portion 29 and a heating power display portion 30 (co-used with roaster and central heater). In this case, red and blue are used as a display color for the display portions 24 to 30.

A temperature sensor is provided so as to be located at the undersides of the heating portions 16 and 17 of the top plate 15 although not shown. A control device including a microcomputer is provided in the operating portion 6 although not shown. The control device has a function of controlling the heating units such as the left and right heating coils 12 and 13, the central heater 14 and the heater (not shown) of roaster 5 and the heating power display portions 20 and 21, the caution hot display portion 22 and the fluorescent display tube 23.

In the above-described arrangement, the heating power display portions 20 and 21 are arranged so as to display degrees of heating power of the heating coils 12 and 13 by the number of lighted LEDs 19 respectively. The caution hot display portion 22 is lighted when a temperature detected by the temperature sensor is higher than a set temperature. The fluorescent display tube 23 is lighted to display various display contents.

Figure 5:
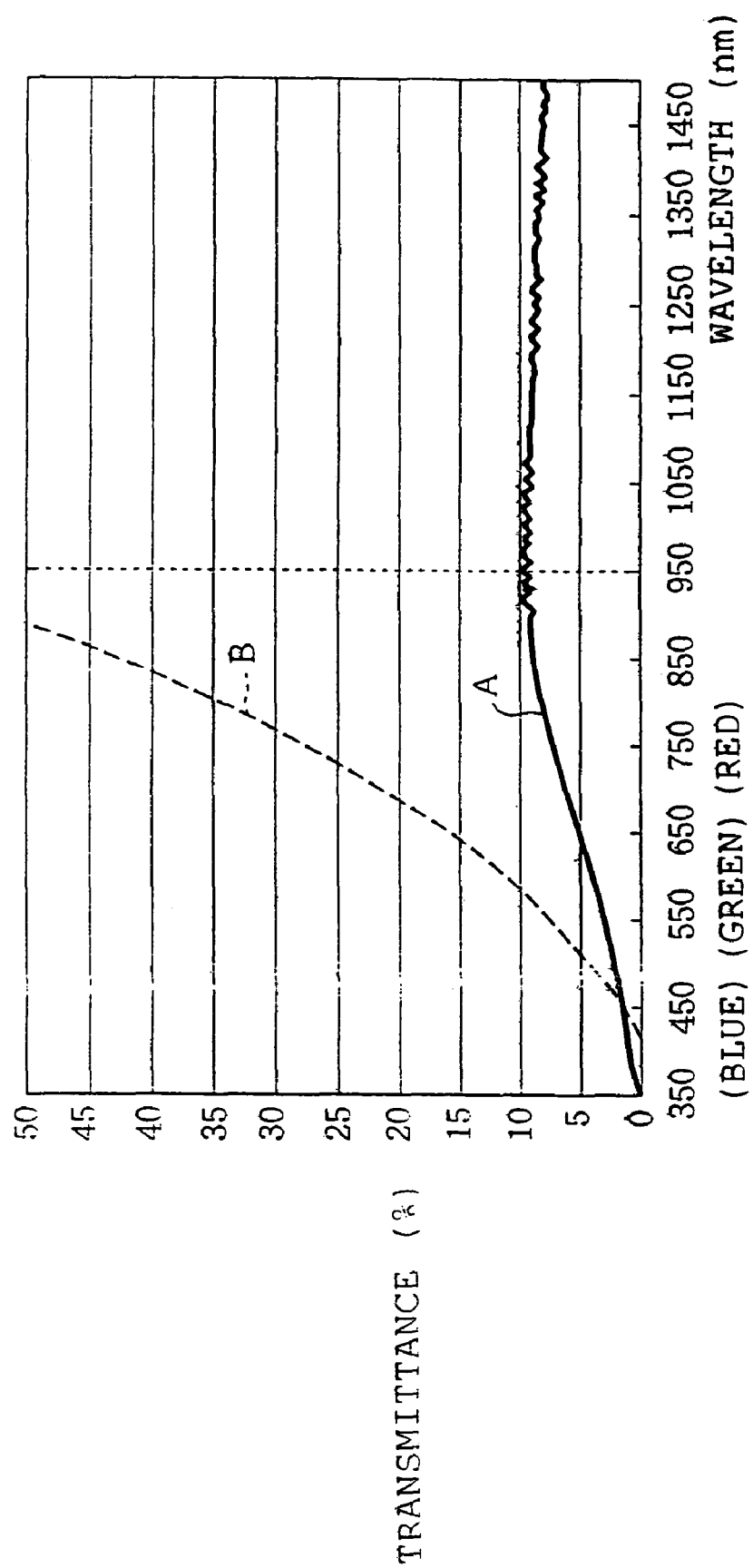
FIG. 5 is a view showing the light transmittance characteristic of the top plate.

FIG. 5 shows the light transmittance characteristic of the top plate. In FIG. 5, characteristic line A relates to the top plate 15 of the embodiment (sputtering titan). In a visible light range (about 400 nm to 700 nm), a spectral transmission approximately at 700 nm corresponding to red is rendered larger than a spectral transmission approximately at 500 nm corresponding to blue or green.

In the foregoing embodiment, the fluorescent display tube 23 is employed as the displaying unit provided below the top plate 15. The anode itself emits light in the fluorescent display tube 23. The fluorescent display tube 23 provides a larger view angle and higher luminance as compared with liquid crystal displays. Accordingly, the fluorescent display tube 23 has an advantage that displayed contents can easily be viewed even when viewed obliquely upward or even while the state of an object being cooked or the operating portion 6 are being viewed. Moreover, since the top plate 15 is translucent, non-lighted portions become invisible although portions lighted by the fluorescent display tube 23 are visible. Thus, since only the necessary portions can be displayed and unnecessary portions can be rendered invisible, the heating cooker excels in the design characteristic and the displayed contents can be easier to understand.

In the visible light range, the spectral transmission approximately at 700 nm corresponding to red is rendered larger than the spectral transmission approximately at 500 nm corresponding to blue or green as shown in FIG. 5. Accordingly, the top plate 15 has the following characteristic: the luminance of the blue system or green system becomes several times larger than the luminance of the red system by the light emitting efficiency of a fluorescent substance. Accordingly, the luminance of each of red, blue and green can be rendered approximately the same (the luminance of each color is substantially uniformed) when the top plate 15 is configured to render a spectral transmission approximately at 700 nm corresponding to red larger than a spectral transmission approximately at 500 nm corresponding to blue or green as described above. Consequently, the top plate 15 can be rendered easier to view and the design characteristic thereof can be improved.

Furthermore, since displayed contents of the fluorescent display tube 23 may take the form of an illustration, the displayed contents can further be rendered easier to understand. Additionally, since the fluorescent display tube 23 is disposed between the left and right heating coils 12 and 13 adjacent to each other, the tube can perform a displaying operation for both of the heating coils 12 and 13 at a single location.

The LEDs 19 are provided for the display of the heating power display portions 20 and 21 of the heating coils 12 and 13 and the caution hot display portion 22, instead of the fluorescent display tube 23. In particular, the LED 19 is a light source having a longer service life and lower power consumption than the fluorescent display tube 23. When the LEDs 19 are used for the caution hot display portion 22, the safety of the heating cooker can be improved and electric power consumption during the displaying can be saved. The fluorescent display tube has a service life of about 8000 hours long and power consumption of about 3 W, whereas the LED has a service life of about 50000 to 100000 hours long and power consumption of about 100 mW.

The top plate 15 comprises the crystallized glass having a thin titan film formed on the backside of the crystallized glass in the foregoing embodiment. However, for example, a thin film of metal such as silicon may be formed as a translucent film. Furthermore, pigmented crystallized glass such as bister crystallized glass may be used. A characteristic line B in FIG. 5 designates pigmented crystallized glass. The characteristic line B also shows that a spectral transmission approximately at 700 nm corresponding to red is larger than a spectral transmission approximately at 500 nm corresponding to blue or green. Accordingly, the characteristic line B can achieve the similar effect to that of the characteristic line A.

Furthermore, a filter may be provided on the underside of the top plate in order that the top plate may be translucent. In this case, it is preferred that a spectral transmission approximately at 700 nm corresponding to red is larger than a spectral transmission approximately at 500 nm corresponding to blue or green in a visible light range, as described above The invention should not be limited by the foregoing embodiment but may be modified or expanded as follows. The heating cooker should not be limited to the built-in type which is built in the cabinet 1 of the kitchen. The heating cooker may be used as a worktop or tabletop type.

The heating unit provided below the top plate 15 should not be limited to the heating coils 12 and 13 for the induction heating and the central heater 14. The heating unit may be a gas.

Figure 7:
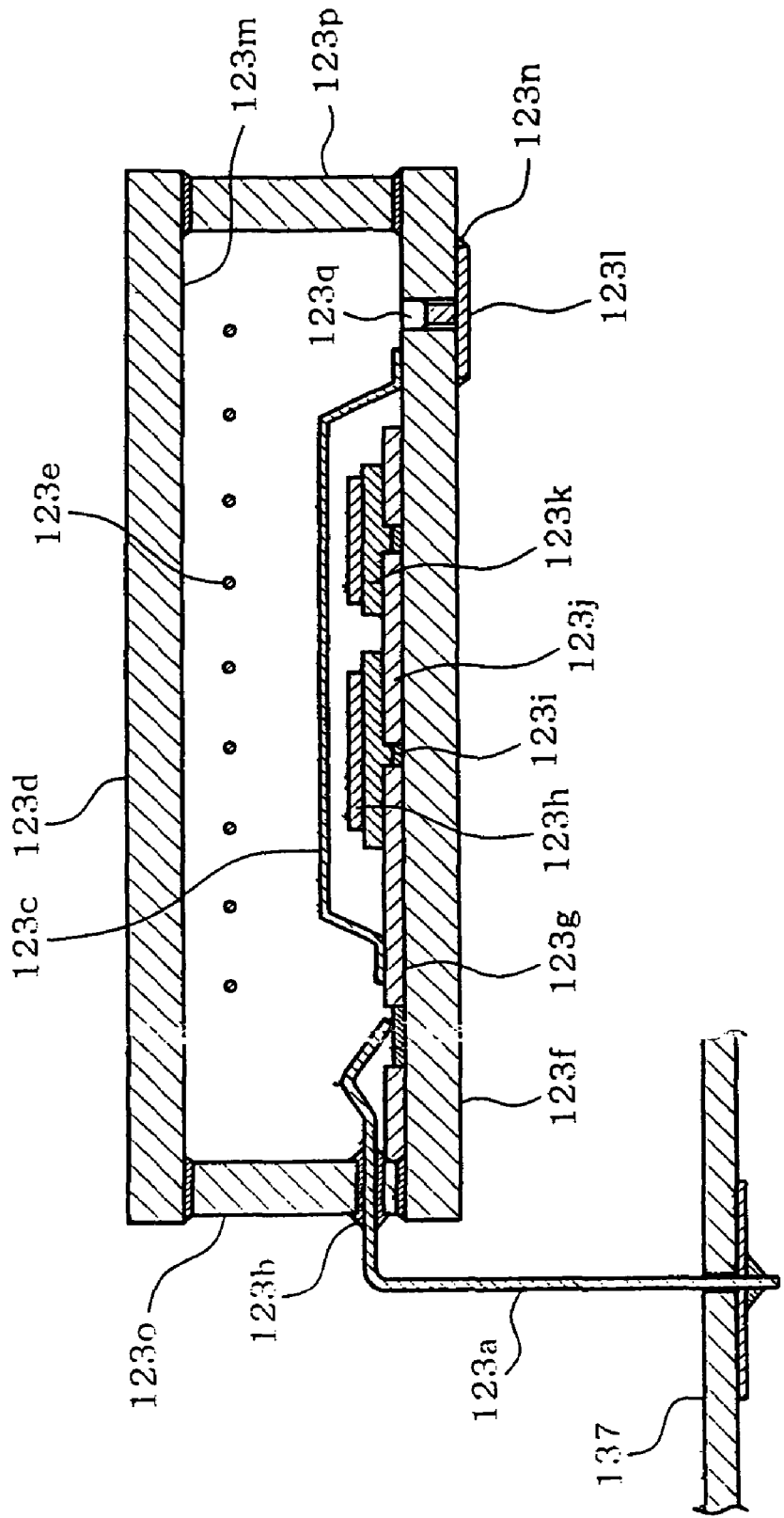
FIG. 7 is a sectional view of the fluorescent display tube taken along line 7-7 in FIG. 6.
Figure 8:
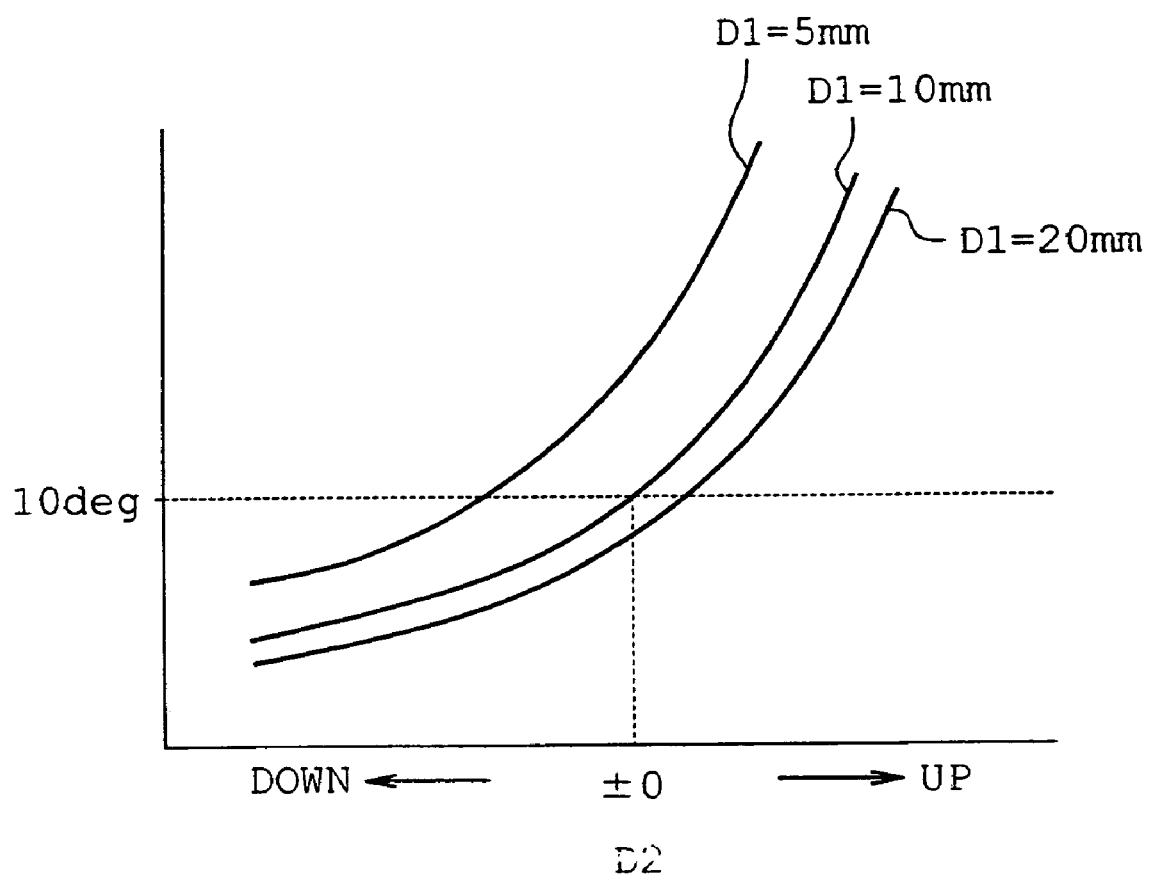
FIG. 8 is a graph showing the relationship between the distance between a ferrite and the fluorescent display tube and an allowable temperature increased by induction heating.
Figure 9:
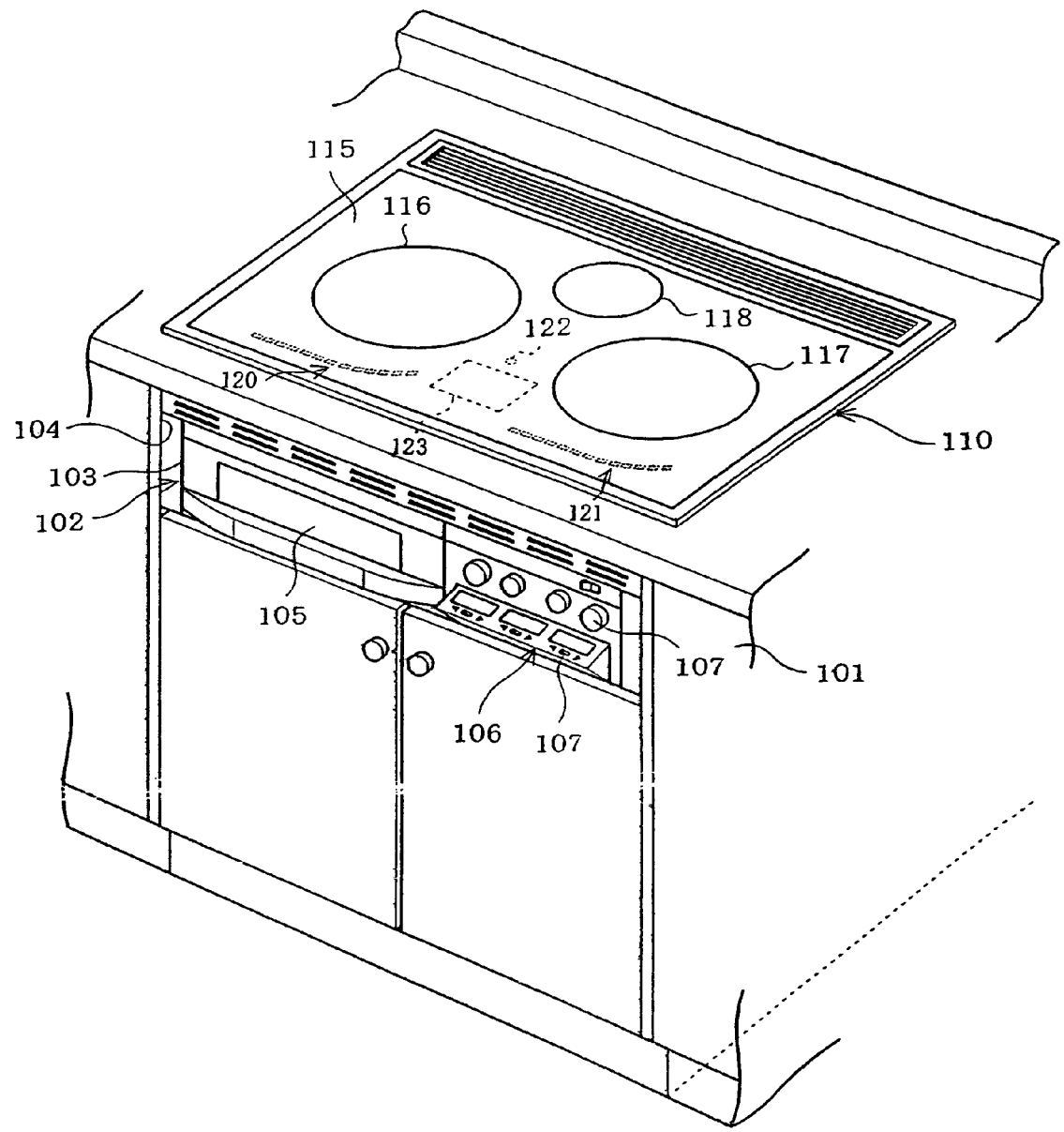
FIG. 9 is a perspective view of the induction heating cooker, showing an appearance thereof.
Figure 10:
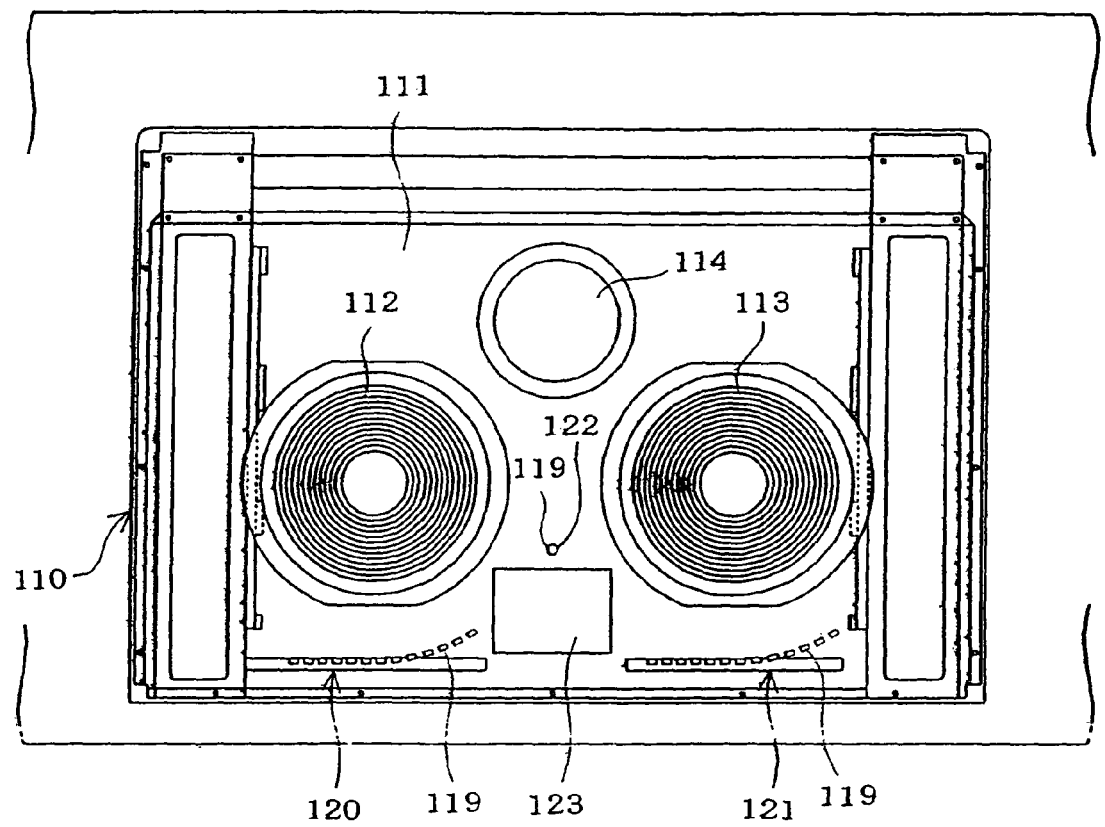
FIG. 10 is a plan view of the major part with the top plate being removed.

FIGS. 6 to 11 illustrate a second embodiment of the invention. Firstly, FIG. 9 is a perspective view showing an appearance of the heating cooker 102 built in the cabinet 101 of the kitchen. FIG. 10 is a plan view of the major part of the heating cooker 102 with the top plate being removed. The body 103 of the heating cooker 102 is housed in a housing 104 provided in the cabinet 101. A roaster 105 is provided in the left of the body 103 whereas an operating portion 106 is provided in the right of the body 103. The operating portion 106 is provided with a plurality of switches 107.

An upper heating unit 110 as shown in FIG. 10 is provided on the top of the body 103. The upper heating unit 110 includes a rectangular box-shaped upper case 111 with an upper opening, left and right heating coils 112 and 113 both for induction heating disposed left and right in the upper case 111 and a central heater 114 comprising a radiant heater, for example, located at a central rear side. The upper heating unit 110 has an upper opening closed by a top plate 115 which is made from heat-resistant glass and disposed to cover the heating coils 112 and 113 and the heater 114 from above.

Circular heating portions 116, 117 and 118 are displayed on the top plate 115 so as to be located over the left and right heating coils 112 and 113 and central heater 114 respectively. The left and right heating coils 112 and 113 are arranged to induction-heat cooking containers when energized while the cooking containers are placed on the heating portions 116 and 117, respectively. Furthermore, the central heater 114 is arranged to heat the cooking container when energized while the cooking container is placed on the heating portion 118.

Heating power displays 120 and 121 are provided in the front interior of the upper case 111 so as to be located in front of the left and right heating coils 112 and 113 respectively. Each heating power display has a number of light emitting diodes (LEDs) 119. A caution hot display portion 122 having an LED 119 and a fluorescent display tube 123 are also provided in the front interior of the upper case 111 so as to be located between the left and right heating coils 112 and 113. Accordingly, the heating power displays 120 and 121, caution hot display portion 122 and fluorescent display tube 23 are disposed below the top plate 115. The heating power displays 120 and 121 are disposed so as to extend substantially along outer circumferences of the corresponding heating portions 116 and 117 respectively. In this case, the top plate 115 is comprised of a generally transparent crystallized glass having a rear surface (underside) formed with a thin metal film such as titan by sputtering, whereupon the top plate is translucent. The top plate 115 has spectral transmission characteristics in a visible light range.

Figure 11:
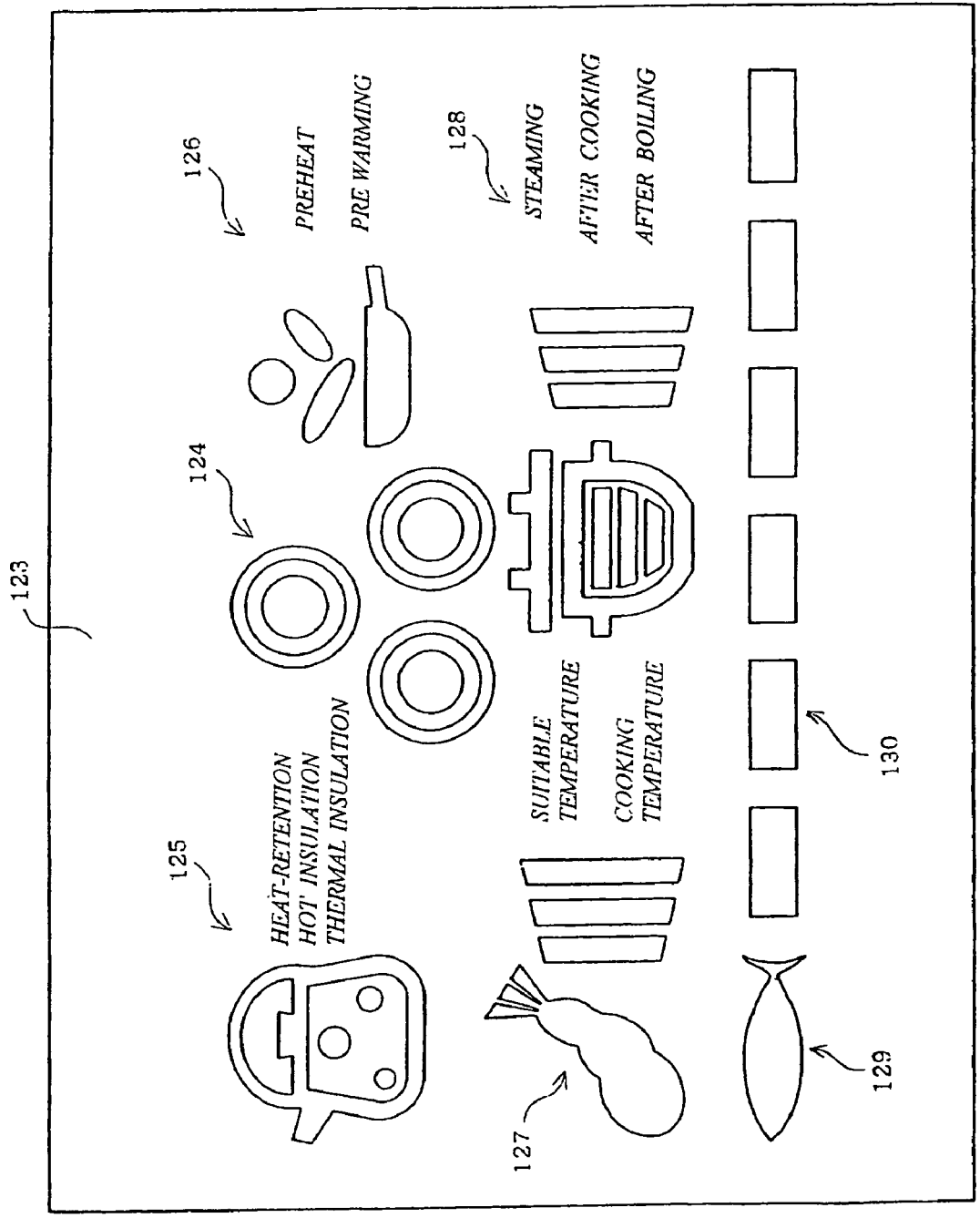
FIG. 11 shows displayed contents of the fluorescent display tube.

FIG. 11 shows a concrete example of displayed contents of the foregoing fluorescent display tube 123. All the display portions are lighted in FIG. 11. The displayed contents of the fluorescent display tube 123 include a usage state display portion 124 displaying a usage state of each of the left and right heating coils 112 and 113 and the central heater 114, a water boiling display portion 125, a sauting display portion 126, a frying display portion 127, a rice cooking display portion 128, a roaster display portion 129 and a heating power display portion 130 (co-used with roaster and central heater). In this case, red and blue are used as a display color for the display portions 124 to 130.

A temperature sensor is provided so as to be located at the undersides of the heating portions 116 and 117 of the top plate 115 although not shown. A control device including a microcomputer is provided in the operating portion 106 although not shown. The control device has a function of controlling the heating units such as the left and right heating coils 112 and 113, central heater 114 and the heater (not shown) of roaster 105, the heating power display portions 120 and 121 and the fluorescent display tube 123, based on an operation signal of the switch 107 of the control portion 106 and a previously stored control program.

In the above-described arrangement, the heating power display portions 120 and 121 are arranged so as to display degrees of heating power of the heating coils 112 and 113 by the number of lighted LEDs 119 respectively. The caution hot display portion 122 is lighted when a temperature detected by the temperature sensor is higher than a set temperature. The fluorescent display tube 123 is lighted to display various display contents.

Figure 6:
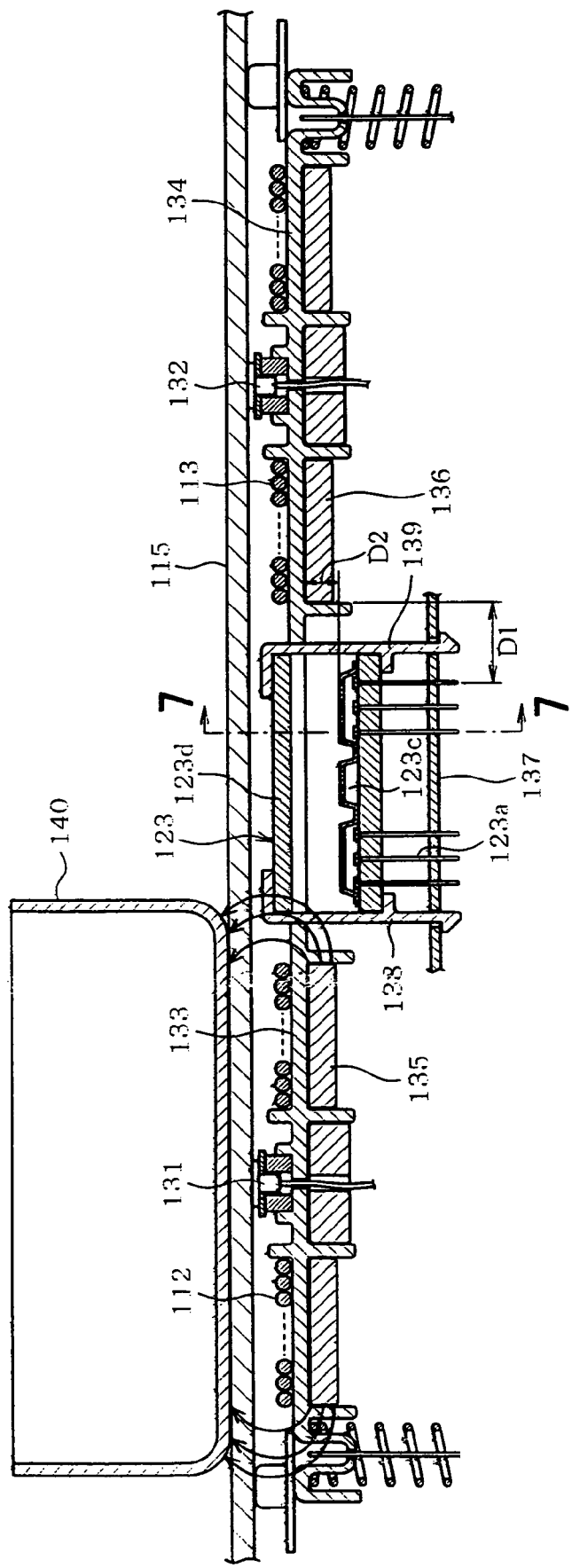
FIG. 6 is a longitudinally sectional front view of a part of an induction heating cooker near the top plate in a second embodiment of the present invention.

FIG. 6 is a longitudinally sectional front view of a part of an induction heating cooker near the top plate 115. Temperature sensors 131 and 132 are disposed in central portions of the heating coils 112 and 113 at the underside of the heating portions 116 and 117 respectively. Furthermore, the heating coils 112 and 113 are placed on mounts 133 and 134 respectively. A plurality of bar-shaped ferrite magnets (permeable substances) 135 and 136 are disposed in a radial format the lower side of the mounts 133 and 134 respectively. The fluorescent display tube 123 located between the heating coils 112 and 113 is supported by supporting members 138 and 139 which are fixed on a printed circuit board 137 so as to stand thereon and so as to be sandwiched between the supporting members 138 and 139 form either side of the tube 123. Additionally, FIG. 7 is a sectional (side) view of the fluorescent display tube 123 taken along line 7-7 in FIG. 6.

The fluorescent display tube 123 includes inner wiring 123$g$ formed on a glass substrate 123$f$, a fluorescent substance 123$h$, through-hole 123$i$, insulating film 123$j$, anode electrode 123$k$ and the like all disposed on the glass substrate 123$f$, as shown in FIG. 7. A filament 123$e$ is disposed over a grid 123$c$. Glass spacers 123$o$ and 123$p$ stand on left and right ends of the glass substrate 123$f$ respectively as viewed in FIG. 7. A display surface glass 123$d$ is placed on the glass spacers to be fixed in position, whereby a box-shaped container is formed. Air is then removed through an exhaust hole 123$q$ formed through the glass substrate 123$f$. Thereafter, the exhaust hole 123$q$ is sealed by a sealing cover 123$l$ and frit glass 123$n$ such that the interior of the container is in a high-vacuum condition.

A transparent conductive film 123$m$ is disposed on an inner surface of the container of the display surface glass 123$d$.

Furthermore, a lead pin 123a is connected to the inner wiring 123g. The lead pin 123a extends outwards through the glass spacer 123o and is then bent downwards at 90 degrees thereby to be connected to the printed circuit board 137. The through opening of the glass spacer 123o is also sealed by the frit glass 123b. DC voltage of about 30 V, for example, is applied between the filament 123e and the anode electrode 123k so that the fluorescent substance 123h emits light for display.

The lead pin 123a, grid 123c and sealing cover 123l are each made from a magnetic metal material such as iron-nickel-chromium alloy. Returning to FIG. 6 again, the fluorescent display tube 123 is disposed so that an upper end of the aforesaid magnetic metal material is located lower than upper surfaces of the ferrites 135 and 136.

The operation of the heating cooker will be described with further reference to FIG. 8. The fluorescent display tube 123 is disposed below the top plate 115 and is operated to display the display contents as shown in FIG. 11. As a result, since display beams reach user's eyes through the translucent top plate 115 when the display portion of the fluorescent display tube 123 is lighted, the user can view the displayed contents through the top plate 115 well. Furthermore, regarding part of the fluorescent display tube 123 other than the display portion, even if external light passes through the translucent top plate 115, no display can be viewed by the user since resultant reflected light does not return. More specifically, since the user can view only a part that should be displayed, the designability of the induction heating cooker can be improved.

Furthermore, the fluorescent display tube 123 can emit light of colors (violet: 400 nm to red: 700 nm) ranging over substantially whole spectrum of visible light according to a material for a fluorescent substance constituting an anode. Accordingly, multicolor display can be realized when the top plate 115 has such spectral transmission characteristics that render the top plate translucent in the range of visible light. Furthermore, the fluorescent display tube 123 provides luminance of blue or green system several times better than luminance of red system depending upon light-emitting efficiency of the fluorescent substance. Accordingly, the luminance of each color can be substantially uniformed when the top plate 115 is set so that a spectral transmission approximately at 700 nm corresponding to red is rendered larger than a spectral transmission approximately at 500 nm corresponding to blue or green.

Furthermore, the magnetic metal member constituting the fluorescent display tube 123 is disposed so as to be located lower than positions of upper sides of the ferrite 135 and 136. This has the following effects. For example, as shown in FIG. 1, when a pan made from a magnetic material is placed at the heating portion 116 side for the purpose of induction heating, an alternating field generated by supplying high-frequency current to the heating coil 112 mostly passes through the bottom of the pan 140 as a magnetic path over the top plate 115 and thereafter travels downwards while spreading in the atmosphere. The alternating field mostly passes through the ferrite 135 as a magnetic path below the top plate 115, subsequently travels upwards while spreading in the atmosphere.

Accordingly, when the fluorescent display tube 123 is disposed so as to come close to the top plate 115, a part of upwardly traveling lines of magnetic force would fall upon the metal material of the fluorescent display tube 123. As a result, it is considered that the metal material may be induction-heated such that the temperature thereof would be increased. When the temperatures of the lead pin 123a of the fluorescent display tube 123 and the sealing lid 123l are increased, the frit glass 123b and 123n is warmed thereby to be softened. As a result, hermetic sealing is lost and thermal electron generated by the filament 123c causes internal discharge. Consequently, there is a possibility that the fluorescent substance 123h may be scattered and/or the filament 123e may be broken.

Furthermore, the fluorescent substance 123h ceases to emit light unless thermal electron reaches the fluorescent substance 123h. When the temperature of the grid 123c is increased, the temperature of the fluorescent substance 123h close to the grid 123c is also increased. Accordingly, heat deterioration of the fluorescent substance 123h is accelerated such that the speed at which the luminance is reduced during light emission is also accelerated. In view of the foregoing, the metal materials constituting the fluorescent display tube 123 are disposed so as to be located lower than positions of upper sides of the ferrite 135 and 136, whereby the metal materials constituting the fluorescent display tube 123 are prevented from being induction-heated by the alternating field generated by the ferrite 135 and 136 as much as possible.

FIG. 8 shows an extent to which the fluorescent display tube 123 should be located lower. This can be achieved by quantitative evaluation to a certain degree as shown in FIG. 8. As shown in FIG. 1, reference symbol D1 designates a horizontal distance between the lead pin 123a located at an end of the fluorescent display tube 123 and the ferrite 136. Reference symbol D2 designates a distance between the upper surface of the ferrite 36 and the grid 23c of the fluorescent display tube 23.

When the pan 140 or the like is induction-heated as described above, it is supposed that an atmospheric temperature in the body of the induction-heating cooker is increased up to the maximum of 60° C. In addition, the induction-heating cooker is set so that the metal members of the fluorescent display tube are induction-heated more or less by the alternating field generated by the heating coils 112 and 113, whereby a rising temperature component is allowed up to 10° C.

Actually, the horizontal distance D1 between the fluorescent display tube 123 and the ferrite 136 also affects the degree of induction heating. The induction heating is apt to occur less frequently as the distance D1 is rendered large. However, the size of the fluorescent display tube 123 needs to be reduced as the distance D1 is increased. Accordingly, when the limit of the size is set, for example, at 20 mm and D1 is changed from 10 mm to 5 mm and so on, the degree of temperature rise is increased. More specifically, as shown in FIG. 8, suppose a case where a temperature increase by the induction heating becomes 10° C. when the vertical distance D2 is a predetermined relative reference value (±0) and D1 is set at 10 mm. In this case, the distance D2 can be rendered shorter when D1 is set at 20 mm. The distance D2 needs to be rendered longer when D1 is set at 5 mm. Optimum relationship is set according to individual design on the basis of the relationship between allowable temperature increase by the induction heating and distances D1 and D2 as described above.

Furthermore, the fluorescent display tube 123 is disposed so that the surface side of the display surface glass 123d is spaced away from the underside of the top plate 115 by 2 mm or above, apart from the above setting. For example, when the user fills a pan or the like with water and then places the pan with the increased weight on the top plate 115, the top plate instantaneously bends. Accordingly, when both are spaced away from each other 2 mm or above, a bent portion is prevented from abutting against the display surface glass 123d even if the top plate 115 bends.

In the foregoing embodiment, the ferrite magnets 135 and 136 are disposed below the heating coils 112 and 113. The fluorescent display tube 123 is disposed below the top plate 115 made of the translucent material so that at least a part of the metal member constituting the fluorescent display tube 123 is located lower than the positions of the upper surfaces of the ferrite magnets 135 and 136. Accordingly, the fluorescent display tube 123 can perform high luminance display, and the display can sufficiently be viewed even when the displaying portion of the top plate 115 is translucent. Furthermore, since the fluorescent display tube 123 has a high degree of freedom in display without limitation in the view angle, the designability of the induction heating cooker can be improved. Furthermore, the fluorescent display tube 123 is not almost affected by the magnetic flux traveling from the sides of the ferrite magnets 135 and 136 below the top plate 115 toward the upper side. Accordingly, the fluorescent display tube 123 can be prevented from being excessively induction-heated, whereupon the service life of the fluorescent display tube can be assured.

Furthermore, the upper end of the lead pin 123a constituting the fluorescent display tube 123 is located lower than the upper surfaces of the ferrite magnets 135 and 136. Accordingly, the lead pin 123a, which is a relatively larger metal member constituting the fluorescent display tube 123, can be prevented from being induction-heated and temperature increase can be avoided well. Additionally, since the sealing cover 123l of the fluorescent display tube 123 is disposed on the glass substrate 123f at the underside of the tube, the sealing cover 123l and frit glass 123n can be prevented from being induction-heated, whereupon the fluorescent display tube 123 can be maintained in an air-tight state.

In addition, the surface side of the display surface glass 123d constituting the fluorescent display tube 123 is disposed so as to be spaced away 2 mm or above from the underside of the top plate 115. Accordingly, even when the top plate 115 side is bent, the bent portion can be prevented from abutting against the display surface glass 123d, whereupon failure of the fluorescent display tube 123 can be prevented.

The present invention should not be limited by the foregoing embodiment but may be modified as follows.

The filament 123c of the fluorescent display tube 123 may be located lower than the position of the upper surfaces of the ferrite magnets 135 and 136.

FIG. 8 shows an example of setting and the setting may be changed according to individually assumed conditions.

Permeable substances should not be limited to the ferrite magnets 135 and 136 but may be another suitable material having high magnetic permeability.

The fluorescent display tube 123 may be constructed so that the fluorescent substance 123h, anode electrode 123k, insulating film 123j, inner wiring 123g and the like are disposed inside the display surface glass 123d.

When the top plate 115 has sufficient stiffness, the surface side of the display surface glass 123d need not be spaced from the underside of the top plate 115 by 2 mm or above. Both may be closely adhered to each other, instead, for example.

The arrangement of the display portion using the fluorescent display tube 123 is not limited to that shown in FIG. 9. For example, the display portion may be disposed on a corner of the top plate 115 or between the heating portions 116 and 117.

INDUSTRIAL APPLICABILITY

As described above, the heating cooker of the present invention is suitable as a heating cooker for use in a home kitchen and particularly useful as a built-in type heating cooker built in a kitchen cabinet.

The invention claimed is:

1. A heating cooker in which an object to be heated is placed on a top plate and is heated by a heating unit provided below the top plate, wherein the heating unit comprises an induction heating coil, a permeable substance disposed below the induction heating coil, a fluorescent display tube disposed below the top plate, and a mount on which the heating coil is placed, and wherein at least part of a metal member constituting the fluorescent display tube is disposed so as to be located lower than a position of an upper side of the permeable substance, and light emitted from the fluorescent display tube travels upward and impinges on the top plate without being blocked by the mount and the permeable substance, then passing through the top plate.

2. The heating cooker of claim 1, wherein the fluorescent display tube includes a lead pin disposed so as to be located lower than a position of an upper side of the permeable substance.

3. The heating cooker of claim 1, wherein the fluorescent display tube includes a sealing cover disposed on an underside glass substrate.

4. The heating cooker of claim 1, wherein the fluorescent display tube includes a display surface spaced away from an underside of the top plate by not less than 2 mm.

* * * * *